2,925,391

PROCESS FOR THE REACTIVATION OF A SUPPORTED PALLADIUM HYDROGENATION CATALYST

Raymond Lait, St. Albans, Gerald Frederick Lewis, Luton, and Kenneth Michael Hack, Almondsbury, Bristol, England, assignors to Laporte Chemicals Limited, Luton, England, a British company No Drawing. Application November 10, 1955
Serial No. 546,254

Claims priority, application Great Britain December 9, 1954

3 Claims. (Cl. 252—414)

This invention relates to improvements in the catalytic reduction of autoxidised organic compounds and the application thereof to the manufacture of hydrogen peroxide.

It is already well-known that hydrogen peroxide can be manufactured by a process employing the autoxidation of certain organic compounds. Thus, for example, United Kingdom specification No. 465,070 describes a process for the production of hydrogen peroxide in which an alkylated anthraquinone is hydrogenated in a solvent by means of hydrogen in the presence of a catalyst, and is then oxidised with oxygen to produce hydrogen peroxide with regeneration of the alkylated anthraquinone. The process is thus cyclic, as the alkylated anthraquinone is recycled to the hydrogenation stage after removal of hydrogen peroxide by, for example, aqueous extraction.

In French specification No. 1,068,893, the organic compound used is phenazine or a derivative thereof, which is reduced to dihydrophenazine or a derivative thereof and again autoxidised to the phenazine starting compound, with simultaneous production of hydrogen peroxide.

Various catalysts have been proposed for use in the hydrogenation stage of the process, one of the most satisfactory of these being active palladium deposited on a carrier such as alumina, magnesia or titania. Thus, United Kingdom specification No. 686,574 describes a cyclic autoxidation process for the manufacture of hydrogen peroxide, in which the catalyst used in the hydrogenation stage is palladium on activated alumina. Our U.S. application Serial No. 434,338 describes a similar process, in which the catalyst is metallic palladium on magnesium hydroxide or magnesia, while our U.S. application Serial No. 431,294 describes a catalyst of metallic palladium on titania.

It is also well-known that, in the catalytic hydrogenation stage of such a process, the activity of the catalyst used decreases with each cycle, until the yields of hydrogen peroxide per unit weight of catalyst are no longer economic. It thus becomes necessary to reactivate the catalyst, and various processes have been proposed for this. Thus, United Kingdom specification No. 686,574 describes the reactivation of the hydrogenation catalyst which has become inactivated during use, by contacting this inactive catalyst with an oxidising agent such as hydrogen peroxide, an organic peracid, hypochlorites or chlorites.

It is an object of this invention to provide an improved process for the reactivation of catalysts which have become inactive after use in the hydrogenation stage of a cyclic process for the production of hydrogen peroxide, utilising the alternate reduction and autoxidation of organic compounds.

It has now been found according to this invention that a catalyst consisting of metallic palladium supported on a carrier, which has become inactive during use in the hydrogenation stage of a cyclic process involving the alternate hydrogenation and autoxidation of organic compounds, can be satisfactorily reactivated by treating it with a non-oxidising aqueous alkaline solution, preferably at a pH greater than 12. Preferably, the aqueous solution contains a caustic alkali such as sodium hydroxide, but other non-oxidising aqueous solutions of alkaline-reacting salts or mixtures thereof, for example alkali metal carbonates or phosphates, may be used. The alkaline solution is preferably used at an elevated temperature. As a preliminary to the reactivating treatment of the deactivated catalyst, it is freed from any residue of the organic compounds with which it has been associated in the hydrogenation step of the cyclic hydrogenation and autoxidation process and also from the solvent medium in which such organic compounds and the catalyst were suspended during the hydrogenation step. This may be brought about in any suitable manner, as, for example, by washing the deactivated catalyst in benzene and thereafter drying at a temperature sufficient to drive off any benzene remaining on the catalyst after the washing treatment.

Accordingly, the present invention provides a process for the reactivation of a catalyst used in the manufacture of hydrogen peroxide by the alternate hydrogenation and autoxidation of an organic compound dissolved in a solvent or solvent mixture with removal of the hydrogen peroxide formed and recycling of the autoxidised compound, wherein the supported palladium hydrogenation catalyst employed, after it has become deactivated, is reactivated by treatment with a non-oxidising aqueous alkaline solution, preferably at a pH greater than 12.

When the activity of the supported palladium catalyst has dropped below an economic limit, the catalyst is freed from any residue of the organic compounds with which it has been associated in the hydrogenation step of the cyclic hydrogenation and autoxidation process and also from the medium in which such compounds and the catalyst were suspended during the hydrogenation step, and thereafter is reactivated by treating it, for example, with a solution of sodium hydroxide, as in the following Examples 1 to 3, which illustrate the invention. Example 4, which is given for comparative purposes only, shows the inferiority of reactivation by sodium hypochlorite as compared with reactivation by sodium hydroxide—the results being 55 gm. of hydrogen peroxide per gm. of catalyst as against 76 gm. of hydrogen peroxide per gram of catalyst yield for the reactivated catalysts respectively.

Some catalyst supports, e.g. certain types of silica-alumina, may be wholly or partly dissolved by the aqueous alkaline treating solution, and the treatment of such supports is not contemplated in this invention.

*Example 1*

A 2% palladium on alumina catalyst, prepared as described in our U.S. application Serial No. 350,519, filed April 22, 1953, now abandoned, was used. A solution containing 50 gm. of 2-ethyl anthraquinone per litre of a solvent mixture of equal volumes of benzene and methylcyclohexanol acetate was passed through a hydrogenator vessel and reduced by a stream of hydrogen in the presence of a catalyst. After oxidising the 2-ethyl anthraquinhydrone back to the 2-ethyl anthraquinone, the hydrogen peroxide which was also formed was extracted from the solution with water and the organic solution returned to the hydrogenator, the rate of the solution flow being 4.4 litres/hr. 5 gm. of catalyst were added to the hydrogenator and hydrogenation continued until the catalyst was substantially completely deactivated. The total weight of hydrogen peroxide produced was 95 gm. per gm. of catalyst.

The catalyst, when recovered from the hydrogenator, was washed with benzene and dried at 120° C. 1.5 cc. of 40 gm./litre sodium hydroxide solution were added per gm. of catalyst, the mixture was warmed to 80° C., stirred for two minutes, after which the solution was poured off and the catalyst was washed by decantation with water, until the washings were colourless. The hot sodium hydroxide treatment was repeated and the catalyst was finally washed and dried at 120° C.

When this reactivated catalyst was tested again, the yield of hydrogen peroxide was 76 gm. per gm. of catalyst.

*Example 2*

A 2% palladium catalyst on silica alumina prepared as described in our U.S. application Serial No. 490,138 was used, and was tested as in Example 1. Using new catalyst, the yield of hydrogen peroxide was 103 gm./gm. of catalyst, and, after reactivation as in Example 1, the yield was 95 gm./gm. of catalyst.

*Example 3*

A 2% palladium catalyst on magnesium hydroxide was prepared as described in our U.S. application Serial No. 434,338 and tested as in Example 1. Using new catalyst, the yield of hydrogen peroxide was 140 gm./gm. of catalyst, whereas, after reactivation as in Example 1, the yield was 130 gm./gm. of catalyst.

*Example 4*

The catalyst used was the same as that in Example 1, 95 gm. of hydrogen peroxide being obtained per gm. of catalyst. The catalyst was recovered from the hydrogenator, washed with benzene and dried at 120° C. 10 gm. of catalyst were suspended in 25 cc. of 5% aqueous sodium bicarbonate solution. 5 cc. of 5% aqueous solution of sodium hypochlorite were then added and the mixture was boiled for 5 minutes. The catalyst was then washed by decantation. It was then suspended in 25 cc. of water to which 1 cc. of 35% hydrogen peroxide was added, drop by drop. The catalyst was washed to pH 7 and dried at 120° C. When this catalyst was tested again, the yield of hydrogen peroxide was 55 gm. per gm. of catalyst.

What we claim is:

1. In a process for the reactivation of a supported palladium hydrogenation catalyst used in the manufacture of hydrogen peroxide by the alternate hydrogenation and autoxidation of an organic compound dissolved in at least one solvent with removal of the formed hydrogen peroxide and recycling of the autoxidized compound, the improvement comprising separating said catalyst from said organic compound and said solvent by washing said catalyst with benzene, drying said catalyst, and thereafter intimately contacting said catalyst with a non-oxidizing aqueous alkaline solution at a pH greater than 12.

2. The process of claim 1 wherein said organic compound is an alkylated anthraquinone.

3. The process of claim 2 wherein said alkaline solution is sodium hydroxide.

References Cited in the file of this patent

UNITED STATES PATENTS

| | | |
|---|---|---|
| 2,692,240 | Sprauer | Oct. 19, 1954 |
| 2,787,540 | Appell | Apr. 2, 1957 |